(12) United States Patent
Nishimura et al.

(10) Patent No.: US 10,921,185 B2
(45) Date of Patent: Feb. 16, 2021

(54) SPECTROSCOPIC CAMERA AND ELECTRONIC DEVICE

(71) Applicant: Seiko Epson Corporation, Tokyo (JP)

(72) Inventors: Teruyuki Nishimura, Matsumoto (JP); Ryohei Kuri, Matsumoto (JP); Naoki Kuwata, Shiojiri (JP)

(73) Assignee: Seiko Epson Corporation

( * ) Notice: Subject to any disclaimer, the term of this patent is extended or adjusted under 35 U.S.C. 154(b) by 0 days.

(21) Appl. No.: 16/698,272

(22) Filed: Nov. 27, 2019

(65) Prior Publication Data

US 2020/0173849 A1    Jun. 4, 2020

(30) Foreign Application Priority Data

Nov. 30, 2018 (JP) ................................ 2018-225278

(51) Int. Cl.
*G01J 3/02* (2006.01)
*G01J 3/10* (2006.01)
*H04N 5/225* (2006.01)
*H04N 5/235* (2006.01)
*G01J 3/28* (2006.01)

(52) U.S. Cl.
CPC ............. *G01J 3/027* (2013.01); *G01J 3/10* (2013.01); *G01J 3/2823* (2013.01); *H04N 5/2256* (2013.01); *H04N 5/22525* (2018.08); *H04N 5/2354* (2013.01)

(58) Field of Classification Search
None
See application file for complete search history.

(56) References Cited

U.S. PATENT DOCUMENTS

| 2014/0240513 A1* | 8/2014 | Funamoto | H04N 5/33 348/164 |
| 2015/0131090 A1* | 5/2015 | Osumi | G01J 3/46 356/300 |
| 2016/0069743 A1* | 3/2016 | McQuilkin | G01J 3/0297 356/416 |
| 2016/0127661 A1* | 5/2016 | Hegyi | G01J 3/0229 348/164 |
| 2018/0084231 A1* | 3/2018 | Learmonth | G06T 7/0004 |
| 2018/0153408 A1* | 6/2018 | Yao | G01J 3/10 |
| 2018/0172511 A1* | 6/2018 | Margalit | G01J 3/027 |

FOREIGN PATENT DOCUMENTS

JP          2016-048187 A    4/2016

\* cited by examiner

*Primary Examiner* — Rebecca A Volentine
(74) *Attorney, Agent, or Firm* — Harness, Dickey & Pierce, P.L.C.

(57) ABSTRACT

A spectroscopic camera according to the present disclosure includes: a second light source; a first monochrome imaging element; a first spectral portion and a second spectral portion; and a control unit that controls operations of the second light source, the first monochrome imaging element, the first spectral portion, and the second spectral portion, the second light source and the first monochrome imaging element are disposed to be directed in the same direction, the first spectral portion is disposed between the first monochrome imaging element and the measurement target, and the second spectral portion is disposed between the second light source and the measurement target.

10 Claims, 14 Drawing Sheets

SPECTROSCOPIC CAMERA AND ELECTRONIC DEVICE

The present application is based on, and claims priority from, JP Application Serial Number 2018-225278, filed Nov. 30, 2018, the disclosure of which is hereby incorporated by reference herein in its entirety.

BACKGROUND

1. Technical Field

The present disclosure relates to a spectroscopic camera and an electronic device.

2. Related Art

In the related art, spectroscopic cameras that perform spectrometry (spectrometry device) by receiving light dispersed by spectral elements with imaging element and acquiring the amounts of received light are known and are classified into ones that use a pre-dispersive spectroscopy scheme and ones that use a post-dispersive spectroscopy scheme, and each scheme is selected in accordance with each purpose of use.

Among them, the post-dispersive spectroscopy scheme is a scheme that is effective when a measurement target with unknown specific wavelength is measured, that is, imaged, and is also a scheme that is effective for acquiring a specific wavelength and spectrum shape to recognize properties of the measurement target by scanning an entire region of a specific measurement range.

Meanwhile, the pre-dispersive spectroscopy scheme is a scheme that is effective when a measurement target with a known specific wavelength is measured and is also a scheme by which it is possible to recognize properties of the measurement target by emitting light with a specific wavelength or in a specific wavelength region. Therefore, it is easy to shorten a measurement time and to simplify a device configuration (cost reduction) since the amount of information can be reduced as compared with the aforementioned post-dispersive spectroscopy scheme.

Incidentally, there has been an increased need to provide a single spectroscopic camera, that is, a single electronic device with functions of pre-dispersive spectroscopy and post-dispersive spectroscopy and to use the spectroscopic camera or the electronic device by taking advantage of the respective functions in recent years. Specifically, a utilization method of specifying a specific wavelength of a measurement target with an unknown specific wavelength using post-dispersive spectroscopy and then irradiating the measurement target only with the aforementioned specific wavelength using pre-dispersive spectroscopy, thereby shortening a measurement time or the like can be exemplified.

As one of related arts in which both the functions of pre-dispersive spectroscopy and post-dispersive spectroscopy are provided to a single spectroscopic camera, JP-A-2016-48187, for example, is known. JP-A-2016-48187 discloses a technology of using a spectral element in a switched manner between a light source and a measurement target and between the measurement target and a light receiving element by relatively moving the light source and the light receiving element and the spectral element.

However, the technology has a problem that a mechanism for switching the spectral element in a stage before the light source and the light receiving element is required, this leads to a complicated structure and an increase in device size.

Further, there is a problem that precision of spectroscopic performance is degraded depending on position reproduction precision of the spectral element and the light source and the light receiving element.

SUMMARY

The present disclosure can be implemented as the following application examples.

A spectroscopic camera according to an application example of the present disclosure includes: a second light source that irradiates a measurement target with light; a first monochrome imaging element that captures an image based on reflected light after being reflected by the measurement target; a first spectral portion and a second spectral portion that are configured to selectively emit light with predetermined wavelength from incident light and change a wavelength region of emitted light that is to be emitted therefrom; and a control unit that controls operations of the second light source, the first monochrome imaging element, the first spectral portion, and the second spectral portion, in which the second light source and the first monochrome imaging element are disposed to be directed on the same direction, the first spectral portion is disposed between the first monochrome imaging element and the measurement target, and the second spectral portion is disposed between the second light source and the measurement target.

DESCRIPTION OF EXEMPLARY EMBODIMENTS

Hereinafter, a spectroscopic camera and an electronic device according to the present disclosure will be described in detail with reference to preferred embodiments illustrated in the accompanying drawings.

Note that a case in which the electronic device provided with the spectroscopic camera according to the present disclosure is applied to a smartphone 1 (SP) will be described below.

Smartphone

First Embodiment

Figure 1:
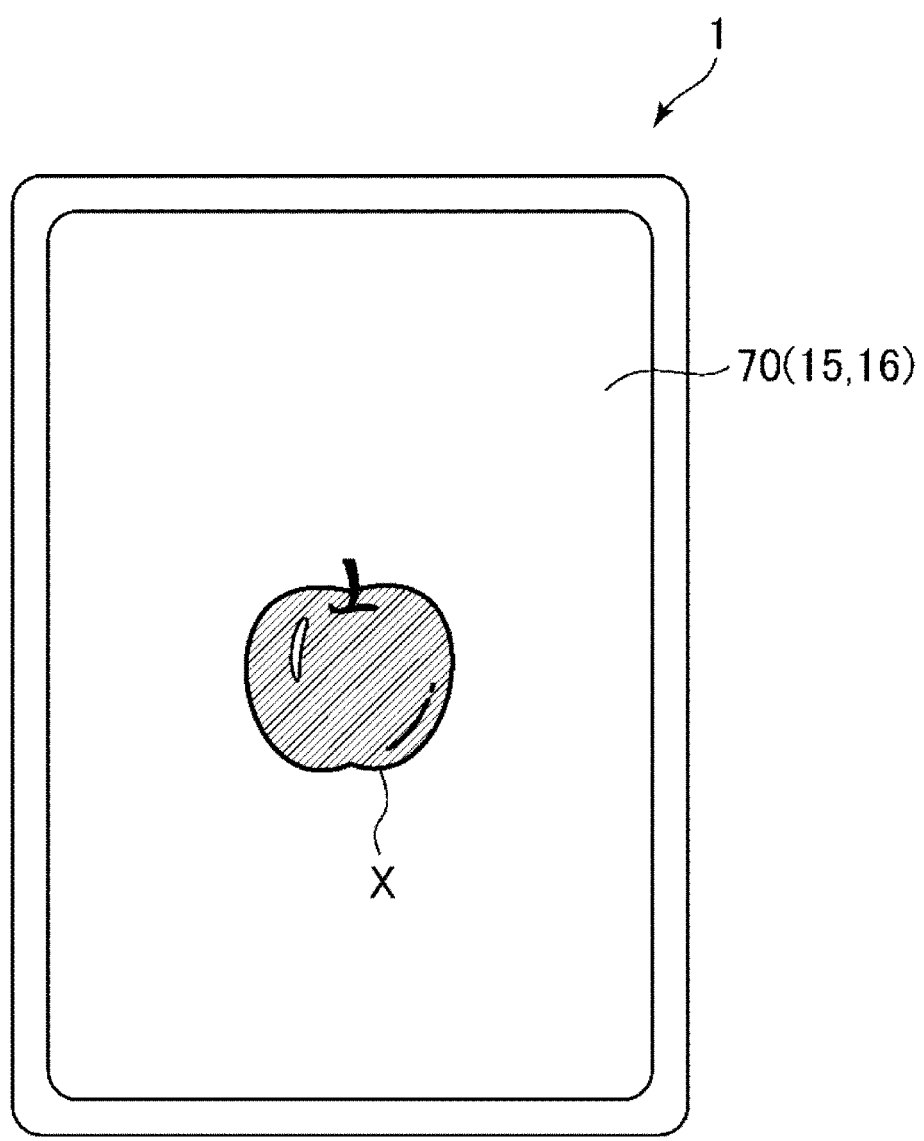
FIG. 1 is a plan view illustrating a front side of an overall image of an embodiment that is applied to a smartphone as an electronic device provided with a spectroscopic camera according to a first embodiment of the present disclosure.
Figure 2:
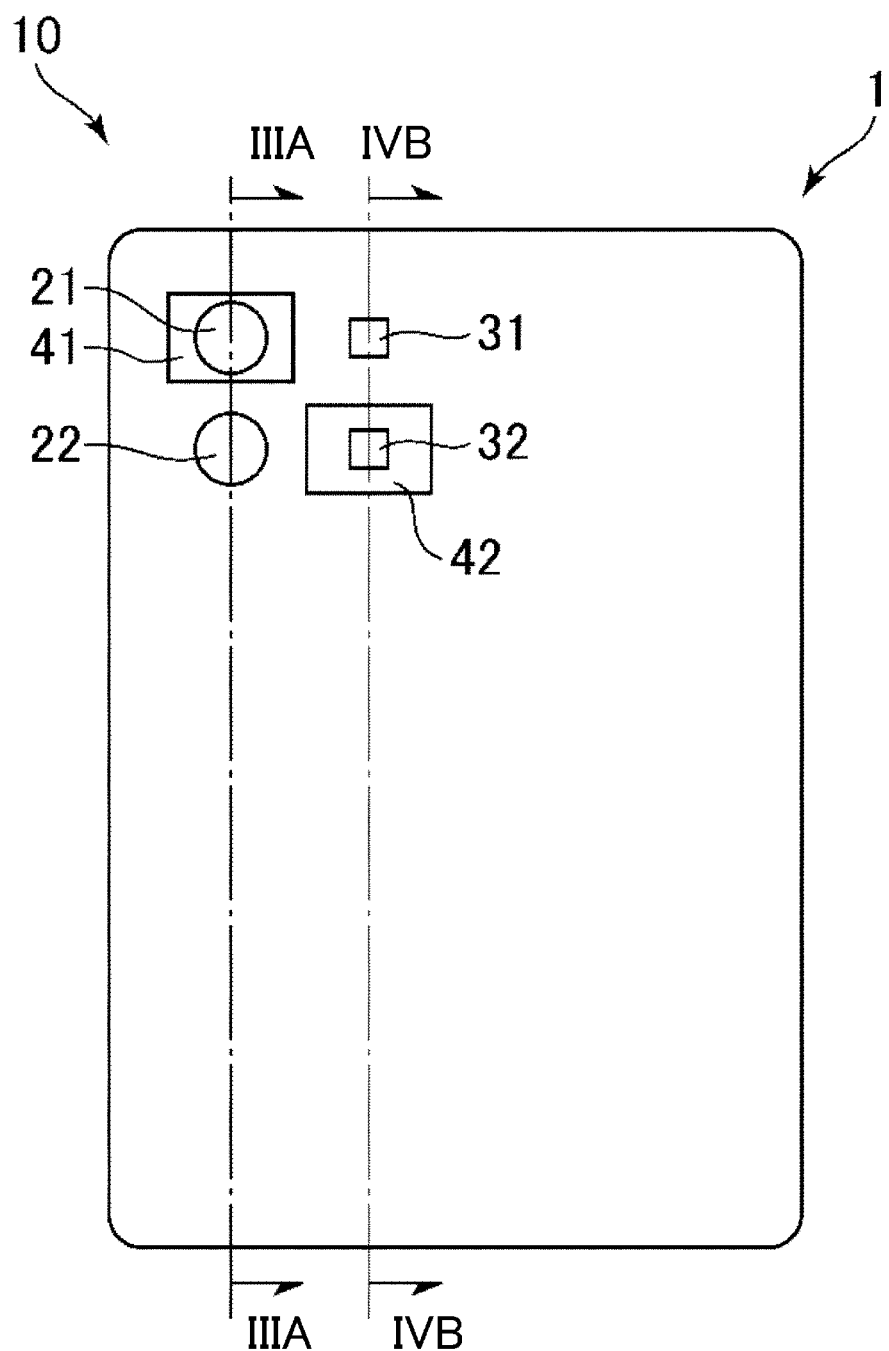
FIG. 2 is a plan view illustrating a rear side of the overall image of the embodiment that is applied to the smartphone as the electronic device provided with the spectroscopic camera according to the first embodiment of the present disclosure.
Figure 3:
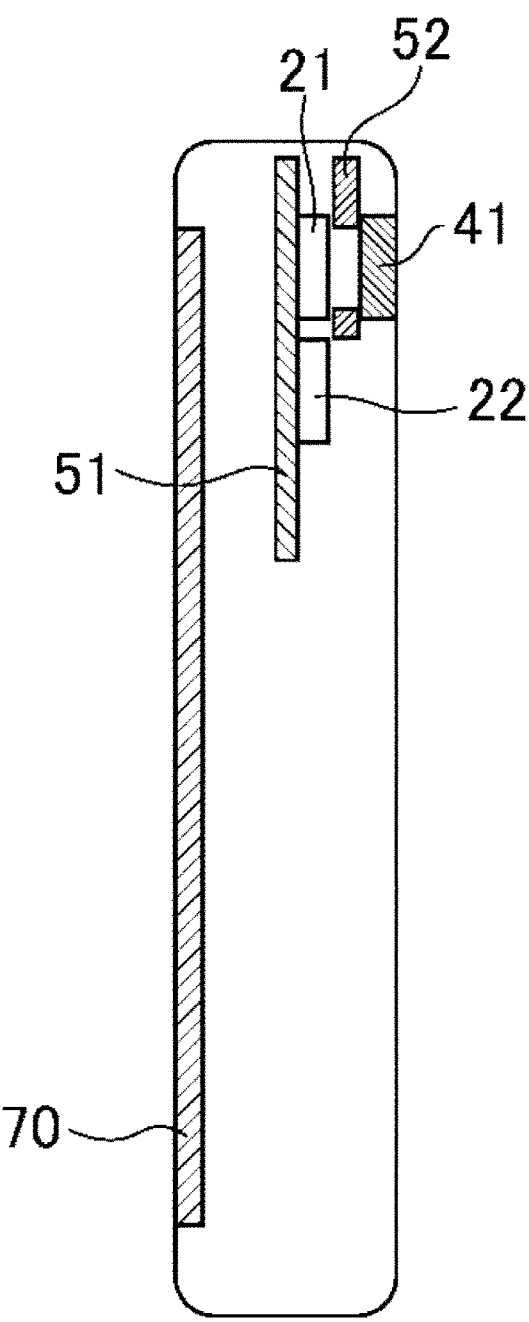
FIG. 3 is a sectional view of the smartphone illustrated in FIG. 2 taken along the line IIIA-IIIA.
Figure 4:
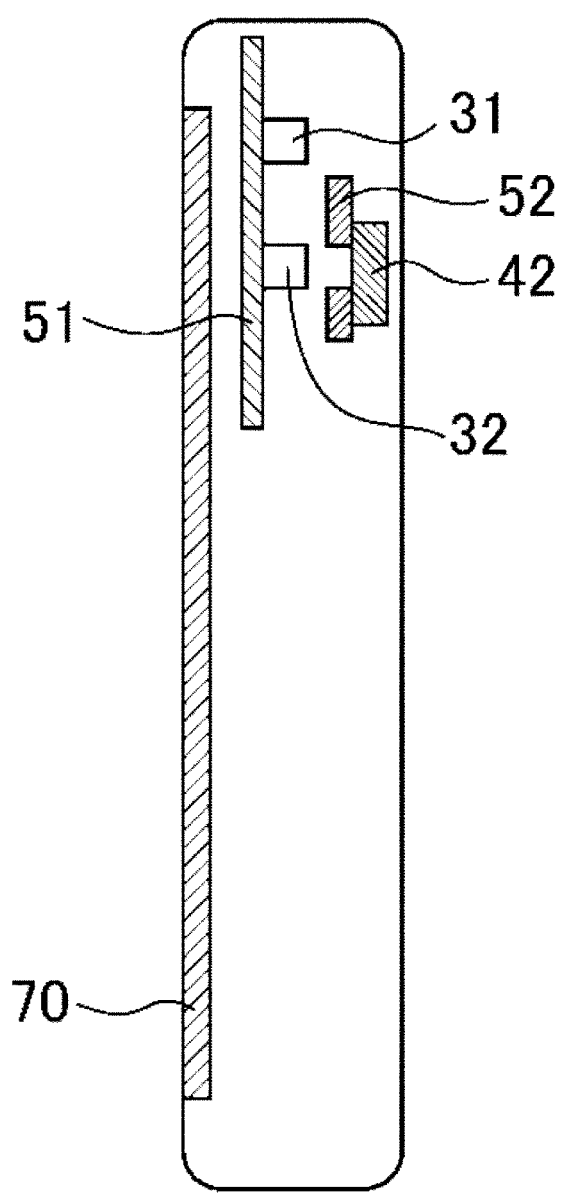
FIG. 4 is a sectional view of the smartphone illustrated in FIG. 2 taken along the line IVB-IVB.
Figure 5:
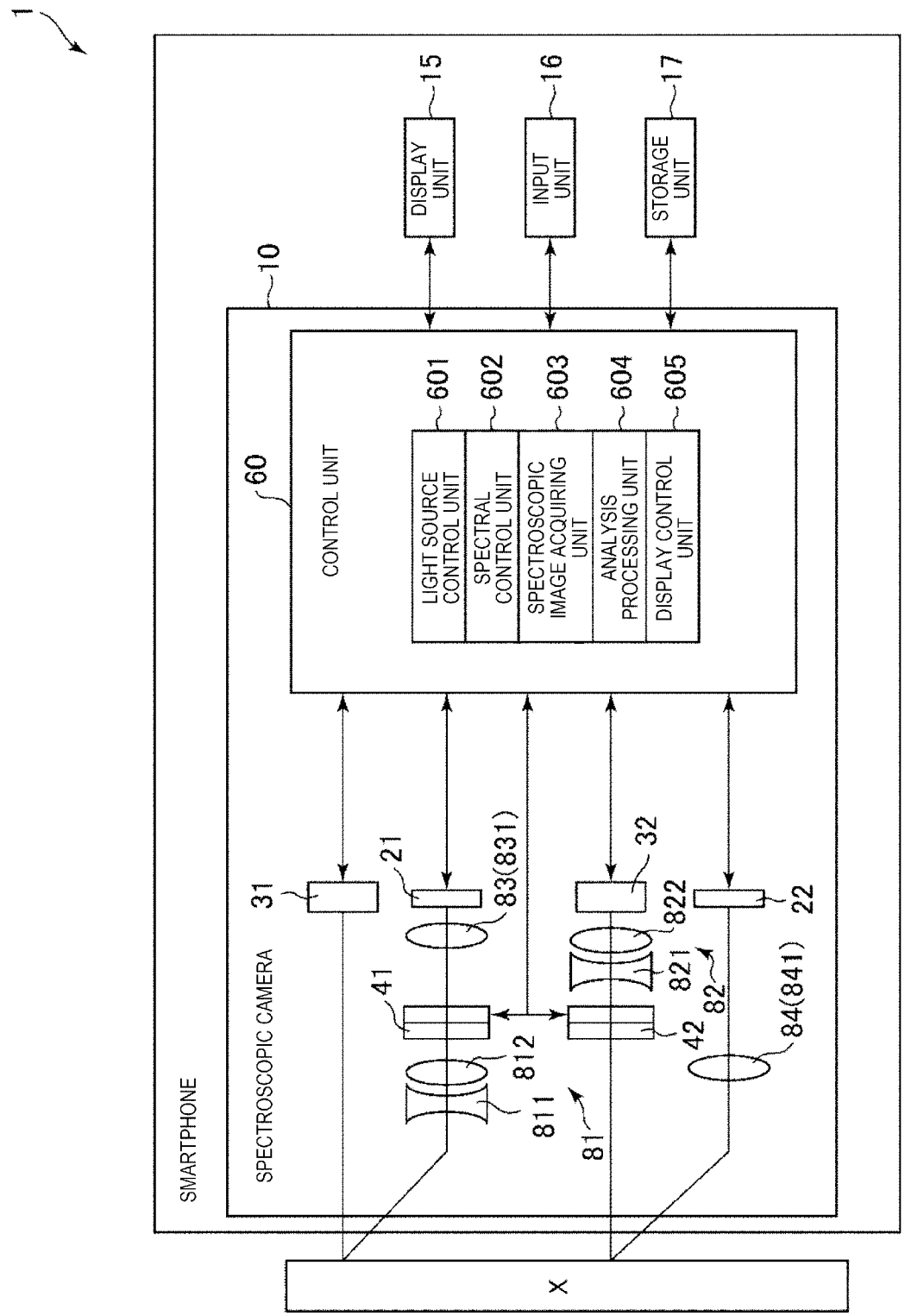
FIG. 5 is a block diagram illustrating an outline configuration of the smartphone illustrated in FIGS. 1 and 2.
Figure 6:
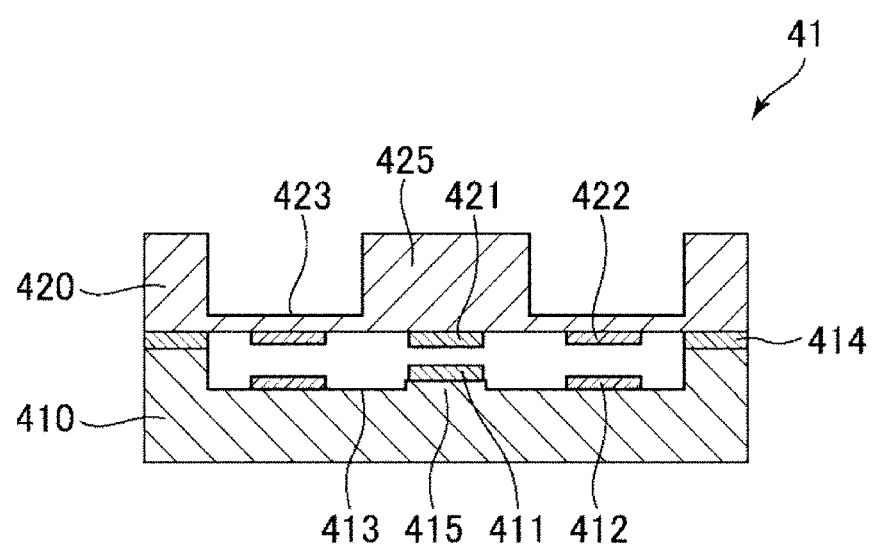
FIG. 6 is a vertical sectional view illustrating an example in which a wavelength variable interference filter that a first spectral portion of the spectroscopic camera included in the smartphone, which is illustrated in FIGS. 1 and 2, is applied to a Fabry-Perot etalon filter.
Figure 7:
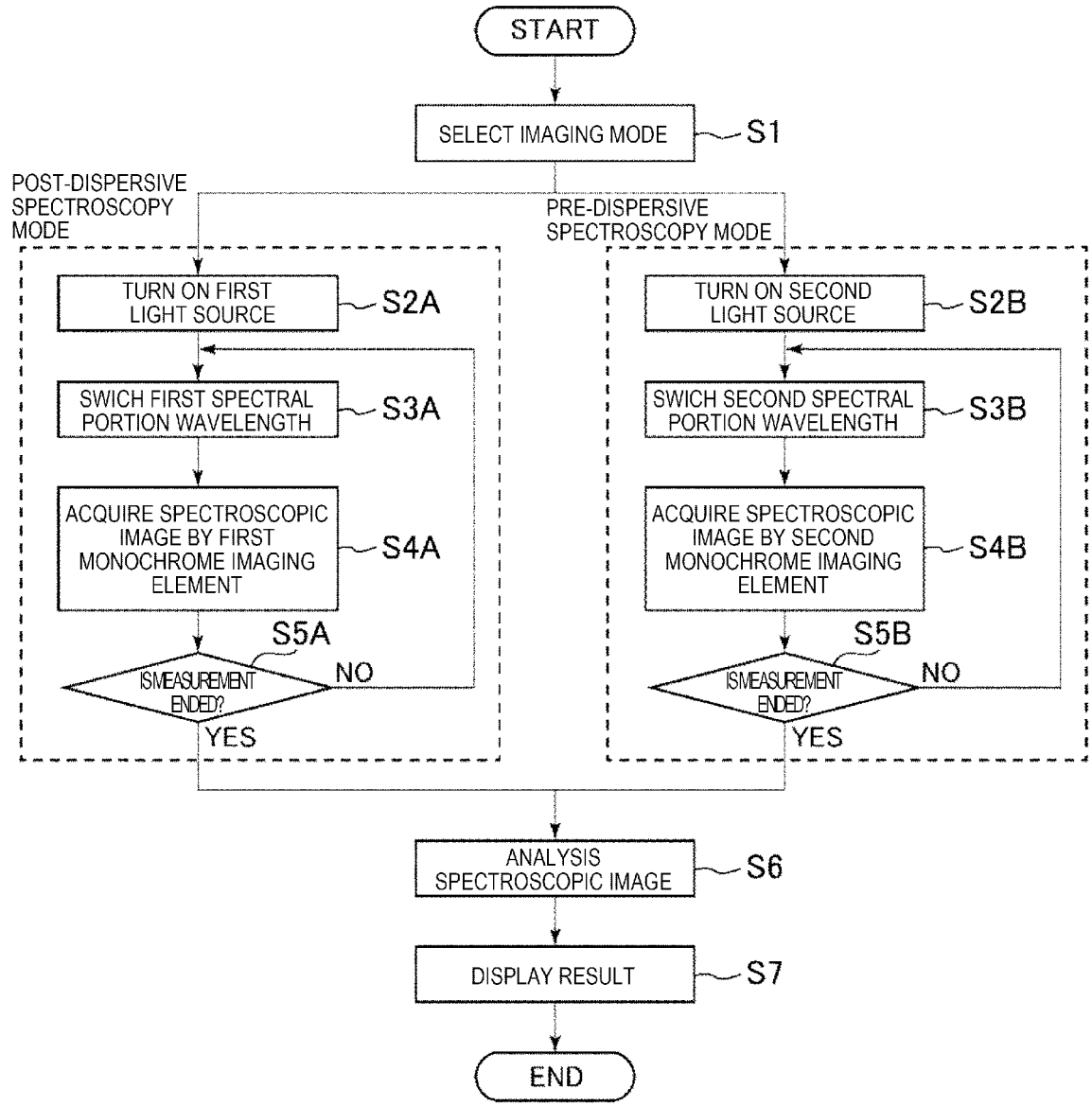
FIG. 7 is a flowchart illustrating a measuring method for performing spectrometry on a measurement target using the smartphone illustrated in FIGS. 1 and 2.

FIG. 1 is a plan view illustrating a front side of an overall image of an embodiment that is applied to a smartphone as an electronic device provided with a spectroscopic camera according to a first embodiment of the present disclosure, FIG. 2 is a plan view illustrating a rear side of the overall image of the embodiment that is applied to the smartphone as the electronic device provided with the spectroscopic camera according to the first embodiment of present the disclosure, FIG. 3 is a sectional view of the smartphone illustrated in FIG. 2 taken along the line IIIA-IIIA, FIG. 4 is a sectional view of the smartphone illustrated in FIG. 2 taken along the line IVB-IVB, FIG. 5 is a block diagram illustrating an outline configuration of the smartphone illustrated in FIGS. 1 and 2, FIG. 6 is a vertical sectional view illustrating an example in which a wavelength variable interference filter that a first spectral portion of the spectroscopic camera included in the smartphone, which is illustrated in FIGS. 1 and 2, is applied to a Fabry-Perot etalon filter, and FIG. 7 is a flowchart illustrating a measurement method of performing spectrometry on a measurement target using the smartphone illustrated in FIGS. 1 and 2.

A smartphone 1 is a mobile terminal device provided with an imaging function and includes a spectroscopic camera 10 according to the present disclosure as an imaging device as illustrated in FIGS. 1 to 5.

Spectroscopic Camera 10

The spectroscopic camera 10 acquires a spectroscopic image by performing pre-dispersive spectroscopy or post-dispersive spectroscopy on light reflected by a measurement target X and imaging light with a selected wavelength. In addition, the captured measurement target X, for example, is specified on the basis of the obtained spectroscopic image, and a display 70 that includes a display unit 15 of the smartphone 1 displays features and constituents of the measurement target X, presence in an imaged region, and the like. Note that the measurement target X is specified and displayed as an apple in the embodiment illustrated in FIG. 1.

The spectroscopic camera 10 includes a first light source 31 and a second light source 32 that irradiates the measurement target X (imaged target) with light, a first monochrome imaging element 21 and a second monochrome imaging element 22 that captures an image based on reflected light after being reflected by the measurement target X, a first spectral portion 41 and a second spectral portion 42 that can selectively emit light with a predetermined wavelength from incident light and change a wavelength region of emitted light that is to be emitted, and a control unit 60 that controls operations of the first light source 31, the second light source 32, the first monochrome imaging element 21, the second monochrome imaging element 22, the first spectral portion 41, and the second spectral portion 42 in the embodiment.

In such a spectroscopic camera 10, the first spectral portion 41 is disposed between the first monochrome imaging element 21 and the measurement target X in a state in which the first light source 31, the second light source 32, the first monochrome imaging element 21, and the second monochrome imaging element 22 are disposed to be directed in the same direction on a rear surface side of the smartphone 1 as illustrated in FIG. 2. In this manner, the spectroscopic camera of the post-dispersive stereoscopy scheme is formed from the first light source 31, the first spectral portion 41, and the first monochrome imaging element 21. The spectroscopic camera of the post-dispersive stereoscopy scheme with such a configuration can acquire a specific wavelength and a spectrum shape and can thus recognize properties of the measurement target X by scanning wavelengths in an entire region (predetermined region) of a specific measurement range. Therefore, this is a scheme that is effective when a measurement target with an unknown specific wavelength is measured, that is, imaged.

Further, the second spectral portion 42 is disposed between the second light source 32 and the measurement target X, and in this manner, the spectroscopic camera of the pre-dispersive spectroscopy scheme is formed from the second light source 32, the second spectral portion 42, and the second monochrome imaging element 22. The spectroscopic camera of the pre-dispersive spectroscopy scheme with such a configuration employs a scheme by which properties of the measurement target X can be recognized by emitting light with a specific wavelength or in a specific wavelength region (note that the following description will be provided by referring the "specific wavelength" as a representative). Therefore, this is a scheme that is effective when the measurement target X with a known specific wavelength is measured and is a scheme that is advantageous in that it is possible to reduce the amount of information as compared with the aforementioned post-dispersive spectroscopy scheme and to thereby shorten a measurement time.

The spectroscopic camera 10 independently includes such a spectroscopic camera of the post-dispersive spectroscopy scheme and a spectroscopic camera of the pre-dispersive spectroscopy scheme and is configured to electrically switch these spectroscopic cameras. Therefore, it is not necessary to mount a mechanism capable of mechanically switching a relative position of a spectral portion (spectral element) provided on a circuit board between the first monochrome imaging element 21 and the measurement target X and between the second light source 32 and the measurement target X unlike the related art, and switching of the relative position in a limited space is omitted. Therefore, it is possible to simplify the structure of the spectroscopic camera 10 and thus to reduce the size of the spectroscopic camera 10 (smartphone 1). Further, it is not necessary to switch the position of the spectral portion (spectral element) between the first monochrome imaging element 21 and the measurement target X and between the second light source 32 and the measurement target X, and the problem that the position reproduction precision thereof leads to degradation of precision of spectroscopic performance of the spectroscopic camera is also solved.

Hereinafter, a configuration of each part included in the spectroscopic camera 10 will be described.

First Light Source 31 and Second Light Source 32.

The first light source 31 and the second light source independently irradiate the measurement target X with illumination light.

The first light source 31 that is a first optical element and the second light source 32 that is a second optical element are arranged in an aligned manner on a circuit board 51 disposed in a case body of the smartphone 1 such that the first light source 31 and the second light source 32 are directed in the same direction on the rear surface side of the smartphone 1 so as to be able to irradiate the measurement target X with the illumination light as illustrated in FIGS. 2 and 4, respectively. That is, the first light source 31 and the second light source 32 can emit the illumination light in the same direction.

In addition, no spectral portion is disposed between the first light source 31 and the measurement target X in them, and in this manner, the measurement target X is irradiated directly with light emitted from the first light source 31.

In contrast, the second spectral portion 42 is disposed between the second light source 32 and the measurement target X, that is, on an optical axis therebetween, and in this manner, emitted light with a specific wavelength in incident light that has been incident on the second spectral portion 42 from the second light source 32 is selectively emitted, and the measurement target X is irradiated with the emitted light.

As such a first light source 31 and a second light source 32, LED light sources, OLED light sources, xenon lamps, halogen lamps, and the like are exemplified, for example, and light sources capable of emitting white light with high intensity over a wavelength region in which the first spectral portion 41 and the second spectral portion 42 formed from wavelength variable interference filters perform spectrometry are preferably used. In addition, the first light source 31 and the second light source 32 may include light sources capable of emitting light with a predetermined wavelength such as infrared light, for example, instead of white light sources.

First Monochrome Imaging Element 21 and Second Monochrome Imaging Element 22

The first monochrome imaging element 21 and the second monochrome imaging element 22 function as detection units that detect reflected light by independently capturing images based on the reflected light after being reflected by the measurement target X.

The first monochrome imaging element 21 and the second monochrome imaging element 22 are disposed in an aligned manner on the circuit board 51 disposed in the case body of the smartphone 1 such that the first monochrome imaging element 21 and the second monochrome imaging element 22 are directed in the same direction on the rear surface side of the smartphone 1 so as to be able to receive reflected light after being reflected by the measurement target X as illustrated in FIGS. 2 and 3, respectively. That is, reflected light incident portions of the first monochrome imaging element 21 and the second monochrome imaging element 22 are respectively disposed to be directed in the same direction.

Among them, the first spectral portion 41 is disposed between the first monochrome imaging element 21 and the measurement target X. In this manner, emitted light with a specific wavelength in the incident light that has been incident on the first spectral portion 41 from the measurement target X is selectively emitted, and the emitted light is captured as an image by the first monochrome imaging element 21.

Meanwhile, no spectral portion is disposed between the second monochrome imaging element 22 and the measurement target X, that is, on the optical axis therebetween, and in this manner, the reflected light after being reflected by the measurement target X is captured directly as a pixel by the second monochrome imaging element 22.

Such a first monochrome imaging element 21 and a second monochrome imaging element 22 are formed using, for example, CCDs, CMOSs, or the like.

First Spectral Portion 41 and Second Spectral Portion 42

The first spectral portion 41 and the second spectral portion 42 can independently and selectively emit light with a spectroscopic wavelength that is a specific wavelength from incident light and change a wavelength region of emitted light that is to be emitted therefrom. That is, light with a specific wavelength is emitted as emitted light from the incident light.

The first spectral portion 41 and the second spectral portion 42 are respectively disposed on the circuit board 52 disposed in the case body of the smartphone 1 as illustrated in FIGS. 2 to 4.

Among them, the first spectral portion 41 is disposed between the first monochrome imaging element 21 and the measurement target X, that is, on the optical axis therebetween. In this manner, emitted light with a specific wavelength in the incident light that has been incident on the first spectral portion 41 from the measurement target X is selectively emitted to the first monochrome imaging element 21.

Meanwhile, the second spectral portion 42 is disposed between the second light source 32 and the measurement target X, that is, on the optical axis therebetween, and in this manner, the measurement target X is irradiated selectively with emitted light with a specific wavelength in the incident light that has been incident on the second spectral portion 42 from the second light source 32.

Such a first spectral portion 41 and a second spectral portion 42 are formed from wavelength variable interference filters such that the wavelength region of the emitted light that is to be emitted therefrom can be changed. Although the wavelength variable interference filters are not particularly limited, wavelength variable-type Fabry-Perot etalon filters, acoustooptic tunable filters (AOTF), linear variable filters (LVF), liquid crystal tunable filters (LCTF), and the like that control a wavelength of penetrating reflected light by adjusting the size of the gap between two filters (mirrors) using an electrostatic actuator, for example, are exemplified, and in particular, Fabry-Perot etalon filters are preferably used.

The Fabry-Perot etalon filters are adapted to extract reflected light with a desired wavelength using multiple interferences of two filters. Therefore, it is possible to significantly reduce the thickness dimension, and specifically, it is possible to set the thickness dimension to be equal to or less than 2.0 mm and thereby to further reduce the sizes of the spectral portions 41 and 42 and thus to reduce the size of the spectroscopic camera 10 (smartphone 1). Therefore, it is possible to realize further size reduction of the spectroscopic camera 10 using the Fabry-Perot etalon filters as the wavelength variable filters.

Here, the first spectral portion 41 and the second spectral portion 42 have the same configuration other than that the first spectral portion 41 and the second spectral portion 42 are disposed at different positions. Therefore, the first spectral portion 41 will be described as a representative with reference to FIG. 6 in regard to the spectral portions to which the wavelength variable-type Fabry-Perot etalon is applied as the wavelength variable interference filters (see FIG. 6).

Each Fabry-Perot etalon filter is a rectangular plate-shaped optical member in a plan view and includes a fixed substrate 410, a movable substrate 420, a fixed reflection film 411, a movable reflection film 421, a fixed electrode 412 and a movable electrode 422, and a joint film 414. In addition, the fixed substrate 410 and the movable substrate 420 are integrally joined to each other via the joint film 414 in a laminated state.

The fixed substrate 410 includes a groove 413 formed through etching in the thickness direction so as to surround the center thereof such that a reflection film mounting portion 415 is formed at the center. The fixed substrate 410 with such a configuration is provided with a fixed optical mirror formed from the fixed reflection film 411 on the side of the movable substrate 420 of the reflection film mounting portion 415 and is provided with the fixed electrode 412 at the groove 413 on the side of the movable substrate 420.

The movable substrate 420 includes a holding portion formed as a groove 423 through etching in the thickness direction so as to surround the center thereof such that a movable portion that is a reflection film mounting portion 425 is formed at the center. The movable substrate 420 with such a configuration is provided with a movable optical mirror formed from the movable reflection film 421 at the reflection film mounting portion 425 on the side of the fixed substrate 410, that is, on the lower surface side and is provided with the movable electrode 422 on the side of the fixed substrate 410.

In the movable substrate 420, the thickness dimension of the groove 423 is formed to be smaller than the reflection film mounting portion 425, and in this manner, the groove 423 functions as a diaphragm that is bent due to an electrostatic attraction force when a voltage is applied between the fixed electrode 412 and the movable electrode 422.

The fixed substrate 410 and the movable substrate 420 can be produced as long as the thicknesses thereof are equal to or greater than about 0.1 mm and equal to or less than about 1.0 mm. Therefore, it is possible to set the thickness of the entire Fabry-Perot etalon filter to be equal to or less than 2.0 mm and to thereby realize size reduction of the spectroscopic camera 10.

The fixed reflection film 411 and the movable reflection film 421 are disposed between such a fixed substrate 410 and a movable substrate 420 such that the fixed reflection film 411 and the movable reflection film 421 face each other via a gap at a substantially center of the fixed substrate 410 and the movable substrate 420. In addition, the fixed electrode 412 and the movable electrode 422 are disposed so as to face each other via a gap with the grove surrounding the center. Among them, the fixed electrode 412 and the movable electrode 422 form an electrostatic actuator that adjusts the size of the gap between the fixed reflection film 411 and the movable reflection film 421.

An electrostatic attraction force caused by applying a voltage between the fixed electrode 412 and the movable electrode 422 that form the electrostatic actuator causes deflection at the holding portion that is the groove 423. As a result, the size of the gap, that is, the distance between the fixed reflection film 411 and the movable reflection film 421 can be changed. In addition, it is possible to select a wavelength of light to be transmitted and selectively emit light with a desired wavelength (wavelength region) from the incident light by appropriately setting the size of the gap. Also, it is possible to control a half width of the light to be transmitted, that is, resolution of the Fabry-Perot etalon filter by changing the configurations of the fixed reflection film 411 and the movable reflection film 421.

Note that the fixed substrate 410 and the movable substrate 420 are respectively formed from, for example, various kinds of glass such as soda-lime glass, crystalline glass, quartz glass, lead glass, potassium glass, borosilicate glass, or alkali-free glass, a crystal, or the like, the joint film 414 is formed from a plasma polymerized film that contains siloxane as a main material, for example, the fixed reflection film 411 and the movable reflection film 421 are formed metal films such as Ag, for example, or alloy films such as an Ag alloy, or dielectric multilayered films that include $TiO_2$ as a high-refraction layer and $SiO_2$ as a low-refraction layer, and further, the fixed electrode 412 and the movable electrode 422 are formed from various conductive materials.

Optical Systems 81 to 84

The spectroscopic camera 10 may be configured to have optical systems 81 to 84 formed from various optical components as illustrated in FIG. 5.

The first spectral portion-side optical system 81 is disposed between the measurement target X and the first spectral portion 41, includes an incident lens 811 as an incident optical system and a projection lens 812, and guides reflected light after being reflected by the measurement target X to the first spectral portion 41.

The second spectral portion-side optical system 82 is disposed between the second light source 32 and the second spectral portion 42, includes an incident lens 822 that is an incident optical system and a projection lens 821, and guides emitted light emitted by the second light source 32 to the second spectral portion 42.

Further, the first imaging element-side optical system 83 is disposed between the first spectral portion 41 and the first monochrome imaging element 21, includes an incident and emitting lens 831, and guides emitted light emitted by the first spectral portion 41 to the first monochrome imaging element 21.

In addition, the second imaging element-side optical system 84 is disposed between the measurement target X and the second monochrome imaging element 22, includes an incident and emitting lens 841, and guides reflected light after being reflected by the measurement target X to the second monochrome imaging element 22.

By the spectroscopic camera 10 including at least one of these optical systems 81 to 84, it is possible to improve a light collecting rates of the imaging elements 21 and 22 from the reflected light after being reflected by the measurement target X.

Note that instead of the aforementioned arrangement (see FIG. 5), the optical systems 81 and 82 may have a configuration in which the first spectral portion-side optical system 81 is disposed between the first spectral portion 41 and the first imaging element-side optical system 83 and the second spectral portion-side optical system 82 is disposed between the second spectral portion 42 and the measurement target X.

Control Unit 60

The control unit 60 is provided in the case body included in the smartphone 1, is formed from a processor as a combination of a CPU, a memory, and the like, for example, and controls operations of each of the first light source 31, the second light source 32, the first monochrome imaging element 21, the second monochrome imaging element 22, the first spectral portion 41, the second spectral portion 42, and the like, that is, operations of the entire or each part of the spectroscopic camera 10.

More specifically, in the post-dispersive spectroscopy mode (first mode) in which the spectroscopic camera of the post-dispersive spectroscopy scheme is operated, the control unit 60 controls operations of the first light source 31, the first spectral portion 41, and the first monochrome imaging element 21 by reading software such as a program stored in a storage unit 17 included in the smartphone 1 on the basis of a user's operation instruction input to an input unit 16 included in the smartphone 1. In addition, the imaged measurement target X is specified, for example, on the basis of the thus obtained spectroscopic image, and features, constituents, and the like of the measurement target X are displayed on the display unit 15 included in the smartphone 1. Meanwhile, in the pre-dispersive spectroscopy mode (second mode) in which the spectroscopic camera of the pre-dispersive spectroscopy scheme is operated, the control unit 60 acquires a spectroscopic image by controlling operations of the second light source 32, the second spectral portion 42, and the second monochrome imaging element 22. In addition, features, constituents, and the like of the measurement target X are displayed on the display unit 15 on the basis of the spectroscopic image.

Note that in the smartphone 1, the display 70 functions both as the display unit 15 and as the input unit 16.

The control unit 60 includes a light source control unit 601, a spectral control unit 602, a spectroscopic image acquiring unit 603, an analysis processing unit 604, and a display control unit 605 as illustrated in FIG. 5.

The light source control unit 601 controls turning on and off of the first light source 31 and the second light source 32 on the basis of a user's operation instruction input to the input unit 16. More specifically, the first light source 31 is turned on in the post-dispersive spectroscopy mode (first mode), and the second light source 32 is turned on in the pre-dispersive spectroscopy mode (second mode).

The spectral control unit 602 acquires a voltage value (input value) of a drive voltage corresponding to the spectroscopic wavelength to be emitted, on the basis of V-λ data stored in the storage unit 17. Then, a command signal is output in order to apply the acquired voltage value to the electrostatic actuators of the Fabry-Perot etalon filters that serve as the first spectral portion 41 and the second spectral portion 42. Also, the spectral control unit 602 performs detection of a timing at which the measurement wavelength is changed, a change in measurement wavelength, a change in drive voltage in accordance with the change in measurement wavelength, determination for ending the measurement, and the like on the basis of various kinds of data stored in the storage unit 17 and outputs command signals on the basis of the determination.

The command signal from the spectral control unit 602 is output to the first spectral portion 41 in the post-dispersive spectroscopy mode in which the first light source 31 is turned on and is output to the second spectral portion 42 in the pre-dispersive spectroscopy mode in which the second light source 32 is turned on.

The spectroscopic image acquiring unit 603 acquires (images) light amount measurement data (the amount of received light) as a spectroscopic image based on reflected light after being reflected by the measurement target X using the first monochrome imaging element 21 and the second monochrome imaging element 22 and causes the storage unit 17 to store the acquired spectroscopic image. Note that the spectroscopic image acquiring unit 603 causes the storage unit 17 to store the measurement wavelength as well along with the spectroscopic image when the storage unit 17 is caused to store the spectroscopic image.

The capturing of the spectroscopic image using the spectroscopic image acquiring unit 603, that is, the operation of the imaging element caused by the spectroscopic image acquiring unit 603 is performed by the first monochrome imaging element 21 in the post-dispersive spectroscopy mode (first mode) in which the first light source 31 is turned on. In addition, the operation is performed by the second monochrome imaging element 22 in the pre-dispersive spectroscopy mode (second mode) in which the second light source 32 is turned on.

The analysis processing unit 604 acquires the spectroscopic image (spectroscopic spectrum) and the measurement wavelength stored in the storage unit 17 and performs the analysis processing thereon. Then, the imaged measurement target X is specified, for example, on the basis of the processing result obtained through the analysis processing by comparing the processing result with a database stored in the storage unit 17.

Note that the acquisition of the spectroscopic image and the measurement wavelength of the analysis processing unit 604 can be performed directly by the spectroscopic image acquiring unit 603 without the storage unit 17.

The display control unit 605 causes the display unit 15 to display information of the measurement target X specified by the analysis processing unit 604 as a visualized image.

As a visualized image displayed on the display unit 15, information such as features, constituents, and characteristics of the specified measurement target X in addition to an image of the specified measurement target X (an apple in FIG. 1) and further recognition precision (%) of the measurement target X, for example, are exemplified.

Display Unit 15, Input Unit 16, and Storage Unit 17

The smartphone 1 includes the display unit 15, the input unit 16, and the storage unit 17 as illustrated in FIG. 5 in addition to the spectroscopic camera 10 as described above.

In the smartphone 1, the display 70 functions both as the display unit 15 and as the input unit 16, and the display unit 15 is formed using a variety of display devices such as a liquid crystal display or an organic EL display, for example. The display unit 15 is provided on the front side of the smartphone 1 and displays various images as illustrated in FIG. 1.

The input unit 16 is provided on the front surface of the display unit 15, for example, includes a touch panel including a touch sensing screen and a sensor for detecting strength of contact with the touch sensing screen, and receives a user's (operator's) input operation.

The storage unit 17 includes various storage devices (memories) such as a ROM and a RAM and stores various kinds of data, programs, and the like needed to control the smartphone 1, in particular, the spectroscopic camera 10. As the data, applications, programs, and the like for realizing various functions of the control unit 60, correlation data V-λ data and the like indicating a wavelength of transmitted light with respect to a drive voltage to be applied to the electrostatic actuator included in the Fabry-Perot etalon filter, and the like are exemplified, for example.

Method for Specifying Measurement Target X

Next, a method for specifying the measurement target X using the aforementioned spectroscopic camera 10 will be described below in detail with reference to FIG. 7 and the like.

That is, a method for specifying the measurement target X on the basis of a command from the control unit 60 for specifying the measurement target X by providing the command through execution of a program stored in the storage device using the control unit 60 in the smartphone 1 that includes the spectroscopic camera 10, the display unit 15, the input unit 16, and the storage unit 17 will be described below.

Note that an exemplary case in which the measurement target X is imaged using the spectroscopic camera 10, the measurement target X is specified on the basis of the captured spectroscopic image, and the image of the specified measurement target X is then displayed on the display 70 will be described below.

<1> First, the user activates an application for operating the spectroscopic camera 10 through an operation of the input unit 16 and then selects conditions such as an imaging mode in response to instructions of the application (S1).

That is, the user selects any one of the post-dispersive spectroscopy mode (first mode) in which the spectroscopic camera of the post-dispersive spectroscopy scheme is operated and the pre-dispersive spectroscopy mode (second mode) in which the spectroscopic camera of the pre-dispersive spectroscopy scheme is operated.

Note that a case in which the post-dispersive spectroscopy mode is selected will be described first, and a case in which the pre-dispersive spectroscopy mode is selected will then be described below.

Post-Dispersive Spectroscopy Mode

<2A> Then, the light source control unit 601 turns on the first light source 31 in a state in which the second light source 32 is turned off in response to a user's input instruction of selecting the post-dispersive spectroscopy mode using the input unit 16 (S2A).

By turning on the first light source 31, the measurement target X is irradiated directly with emitted light (illumination light) emitted from the first light source 31. Then, the emitted light is reflected by the measurement target X, and the reflected light is incident on the first spectral portion 41 as incident light.

<3A> Then, the spectral control unit 602 acquires a voltage value (input value) of a drive voltage corresponding to a spectral wavelength to be emitted on the basis of the V-λ data stored in the storage unit 17. Then, a command signal for applying the acquired voltage value to the electrostatic actuator of the Fabry-Perot etalon filter that serves as the first spectral portion 41 is output (S3A).

In this manner, light with a specific wavelength in the light that has been incident as incident light on the first spectral portion 41 from the measurement target X is selectively emitted as emitted light toward the side of the first monochrome imaging element 21.

Note that the spectral control unit 602 preferably performs adjustment processing of calibrating the first spectral portion 41 prior to the emission of the light with the specific wavelength from the first spectral portion 41.

<4A> Then, the spectroscopic image acquiring unit 603 controls operations of the first monochrome imaging element 21, thereby imaging the light with the specific wavelength emitted as emitted light from the first spectral portion 41 as a spectroscopic image using the first monochrome imaging element 21. That is, light amount measurement data (the amount of received light) of the light with the specific wavelength in the reflected light after being reflected by the measurement target X is acquired as a spectroscopic image by the first monochrome imaging element 21. Then, the spectroscopic image acquiring unit 603 causes the storage unit 17 to store the acquired spectroscopic image along with the measurement wavelength (S4A).

In such a post-dispersive spectroscopy mode, the first spectral portion 41 is disposed on the optical axis of the light received by the first monochrome imaging element 21 between the measurement target X and the first monochrome imaging element 21. In this manner, only the light with the specific wavelength included in the light reflected by the measurement target X is transmitted through the first spectral portion 41, and the intensity of the light with the wavelength is subjected to spectrometry performed by the first monochrome imaging element 21.

<5A> Then, whether or not it is necessary to acquire a spectroscopic image of light with a wavelength for the second acquisition that is different from the wavelength for the first acquisition after the acquisition of the spectroscopic image of the light with the wavelength for the first acquisition is determined on the basis of the conditions selected by the user in the aforementioned process <1>. That is, whether or not it is necessary to subsequently acquire a spectroscopic image of light with a wavelength for the second acquisition that is different from the wavelength for the first acquisition is determined (S5A).

When it is determined to be necessary to acquire the spectroscopic image of the light with the wavelength for the second acquisition in the determination (S5A), the aforementioned process <3A> to this process <5A> are repeatedly performed with the light with the wavelength for the second acquisition instead of the light with the wavelength for the first acquisition. In this manner, the spectroscopic image of the light with the wavelength for the second acquisition is acquired. Such acquisition of the spectroscopic image of the light with the wavelength for the second acquisition, that is, of the light with a different wavelength is repeatedly performed from one or two times to n times. As described above, two-dimensional spectrum information indicating a relationship between each wavelength and light intensity can be acquired by repeatedly performing the aforementioned process <3A> to this process <5A>.

Meanwhile, when it is not necessary to acquire the spectroscopic image of light with the next wavelength, the acquisition of the spectroscopic image in the post-dispersive spectroscopy mode is ended, and the processing proceeds to analysis of the spectroscopic image in the next process <6>.

In the post-dispersive spectroscopy mode as described above, it is possible to acquire the specific wavelength and the spectrum shape and to recognize properties of the measurement target X by scanning wavelengths in the entire region (predetermined region) of a specific measurement range through repetition of the aforementioned process <3A> to this process <5A>. Therefore, it is possible to state that the post-dispersive spectroscopy mode is a measurement mode that is effective when the measurement target X with an unknown specific wavelength is measured (imaged).

Pre-Dispersive Spectroscopy Mode

<2B> Then, the light source control unit 601 turns on the second light source 32 in a state in which the first light source 31 is turned off in response to a user's input instruction of selecting the pre-dispersive spectroscopy mode through the input unit 16 (S2B).

By the second light source 32 being turned on, emitted light (illumination light) emitted from the second light source 32 is incident directly on the second spectral portion 42 as incident light.

<3B> Then, the spectral control unit 602 acquires a voltage value (input value) of a drive voltage corresponding to a spectral wavelength to be emitted on the basis of the V-λ data stored in the storage unit 17. Then, a command signal for applying the acquired voltage value to the electrostatic actuator of the Fabry-Perot etalon filter that serves as the second spectral portion 42 is output (S3B).

In this manner, light with a specific wavelength in the light that has been incident as incident light on the second spectral portion 42 from the second light source 32 is selectively emitted as emitted light toward the side of the measurement target X, and the measurement target X is thus irradiated with the emitted light. Then, the emitted light with the specific wavelength is reflected by the measurement target X, and the reflected light is incident as incident light on the second monochrome imaging element 22.

In such a pre-dispersive spectroscopy mode, the second spectral portion 42 is disposed on the optical axis of the emitted light of the second light source 32 between the second light source 32 and the measurement target X. In this manner, the light with the specific wavelength included in the light emitted from the second light source 32 is selectively transmitted through the second spectral portion 42, and the measurement target X is thus selectively irradiated with the light with the wavelength.

Note that the spectral control unit 602 preferably performs adjustment processing of calibrating the second spectral portion 42 prior to the emission of the light with the specific wavelength from the second spectral portion 42.

<4B> Then, the spectroscopic image acquiring unit 603 acquires the light (incident light) with the specific wavelength reflected by the measurement target X as a spectroscopic image using the second monochrome imaging element 22 by controlling operations of the second monochrome imaging element 22. That is, light amount measurement data (the amount of received light) of the light with the specific wavelength reflected by the measurement target X is acquired as a spectroscopic image by the second monochrome imaging element 22. Then, the spectroscopic image acquiring unit 603 causes the storage unit 17 to store the acquired spectroscopic image along with the measurement wavelength (S4B).

<5B> Then, whether or not it is necessary to acquire a spectroscopic image of light with a wavelength for second acquisition that is different from the wavelength for the first acquisition after the acquisition of the spectroscopic image of the light with the wavelength for the first acquisition is determined on the basis of the conditions selected by the user in the aforementioned process <1>. That is, whether or not it is necessary to subsequently acquire a spectroscopic image of light with a wavelength for second acquisition that is different from the wavelength for the first acquisition is determined (S5B).

When it is determined to be necessary to acquire the spectroscopic image of the light with the next wavelength in the determination (S5B), the aforementioned process <3B> to this process <5B> are repeatedly performed with the light with the wavelength for the second acquisition instead of the light with the wavelength for the first acquisition. In this manner, the spectroscopic image of the light with the wavelength for the second acquisition is acquired. Such acquisition of the spectroscopic image of the light with the wavelength for the second acquisition, that is, of the light with a different wavelength is repeatedly performed from one or two times to n times. As described above, two-dimensional spectrum information indicating a relationship between each wavelength and light intensity can be acquired by repeatedly performing the aforementioned process <3B> to this process <5B>.

Meanwhile, when it is not necessary to acquire the spectroscopic image of the light with the next wavelength, the acquisition of the spectroscopic image in the pre-dispersive spectroscopy mode is ended, and the processing proceeds to analysis of the spectroscopic image in the next process <6>.

The pre-dispersive spectroscopy mode as described above is a scheme by which it is possible to recognize properties of the measurement target X by emitting the light with the specific wavelength in the aforementioned process <3A> to this process <5A>. Therefore, it is possible to state that the pre-dispersive spectroscopy mode is a measurement mode in which it is possible to shorten a measurement time since the pre-dispersive spectroscopy mode is based on a scheme that is effective when the measurement target X with a known specific wavelength is measured and it is possible to reduce the amount of information as compared with the aforementioned post-dispersive spectroscopy scheme.

The post-dispersive spectroscopy mode (first mode) and the pre-dispersive spectroscopy mode (second mode) are configured such that the first light source 31 and the second light source 32 are turned on with a time difference, the post-dispersive spectroscopy mode is performed by operating the first spectral portion 41 and the first monochrome imaging element 21 when the first light source 31 is turned on, the pre-dispersive spectroscopy mode is performed by operating the second spectral portion 42 and the second monochrome imaging element 22 when the second light source 32 is turned on, and a configuration in which the first light source 31 and the second light source 32 are turned on in an at least partially overlapping manner, that is, a configuration in which the first light source 31 and the second light source 32 are turned on in a temporally overlapping manner is preferably employed. In this manner, it is possible to quickly switch the post-dispersive spectroscopy mode and the pre-dispersive spectroscopy mode.

<6> Then, the analysis processing unit 604 performs analysis of the spectroscopic image on the basis of the spectroscopic image (spectroscopic spectrum) and the measurement wavelength stored in the storage unit 17.

That is, the analysis processing unit 604 acquires the spectroscopic image (spectroscopic spectrum) and the measurement wavelength stored in the storage unit 17 in the aforementioned post-dispersive spectroscopy mode or the pre-dispersive spectroscopy mode. Then, the analysis processing is performed thereon, and a feature amount of the measurement target X is extracted on the basis of the processing result of the analysis processing, thereby performing the specification of the imaged measurement target X, for example, through comparison with a database that includes data such as a reference spectrum and learning data stored in the storage unit 17.

<7> Then, the display control unit 605 creates, as a visualized image, the information of the measurement target X specified by the analysis processing unit 604 and then causes the display 70 including the display unit 15 to display the visualized image (S7).

The specification of the measurement target X is performed using the spectroscopic camera 10 through the processes <1> to <7> as described above.

Note that the acquisition of the spectroscopic image of the measurement target X in the post-dispersive spectroscopy mode or the pre-dispersive spectroscopy mode in the method for specifying the measurement target X using the spectroscopic camera 10 has been described, the spectroscopic camera 10 can also function as a camera that acquires a non-spectroscopic monochrome image by being configured to be able to choose a first non-spectroscopy mode (third mode) in which the first light source 31 is turned on when the second monochrome imaging element 22 is operated, in addition to the case in which such a spectroscopic image is acquired.

Although the case in which the spectroscopic camera 10 includes the first light source 31, the first spectral portion 41, and the first monochrome imaging element 21 as the spectroscopic camera of the post-dispersive spectroscopy scheme has been described in the embodiments, the first light source 31 among them may be omitted in the spectroscopic camera 10. In this case, the irradiation of the measurement target X with light is performed using external light such as solar light or indoor illumination in the aforementioned process <2A> in the post-dispersive spectroscopy mode using the spectroscopic camera of the post-dispersive spectroscopy scheme.

Although the case in which the spectroscopic camera 10 includes the second light source 32, the second spectral portion 42, and the second monochrome imaging element 22 as the spectroscopic camera of the pre-dispersive spectroscopy scheme has been described in the embodiments, the second monochrome imaging element 22 among them may be omitted in the spectroscopic camera 10. In this case, the acquisition of the spectroscopic image (observation) is performed directly through user's (operator's) eyes, and the specification of the measurement target X (for example, presence in the imaged region) is also performed by the user in the aforementioned process <4B> in the pre-dispersive spectroscopy mode using the spectroscopic camera of the pre-dispersive spectroscopy scheme.

Second Embodiment

Next, a second embodiment of the spectroscopic camera 10 included in the smartphone 1 will be described.

Figure 8:
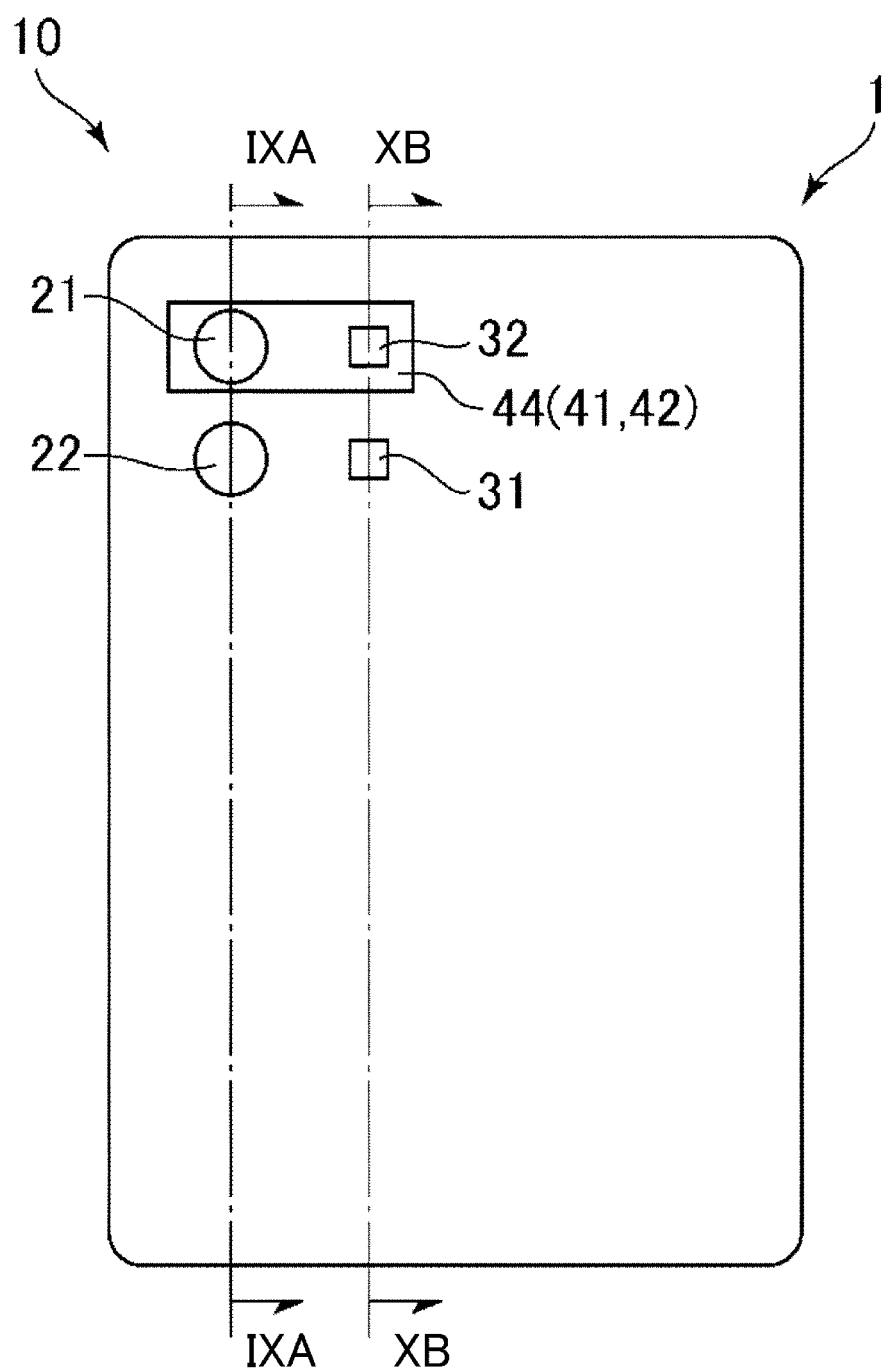
FIG. 8 is a plan view illustrating a rear side of an overall image of an embodiment that is applied to a smartphone as an electronic device provided with a spectroscopic camera according to a second embodiment of the present disclosure.
Figure 9:
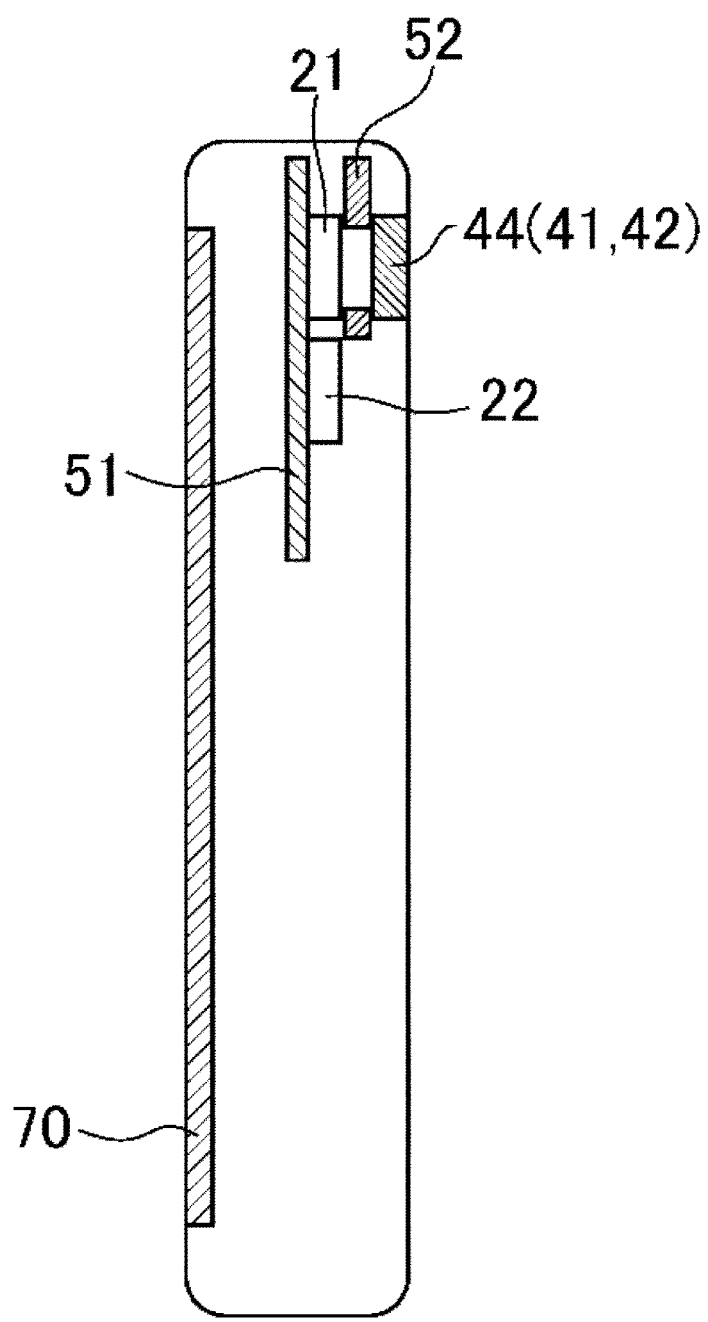
FIG. 9 is a sectional view of the smartphone illustrated in FIG. 8 taken along the line IXA-IXA.
Figure 10:
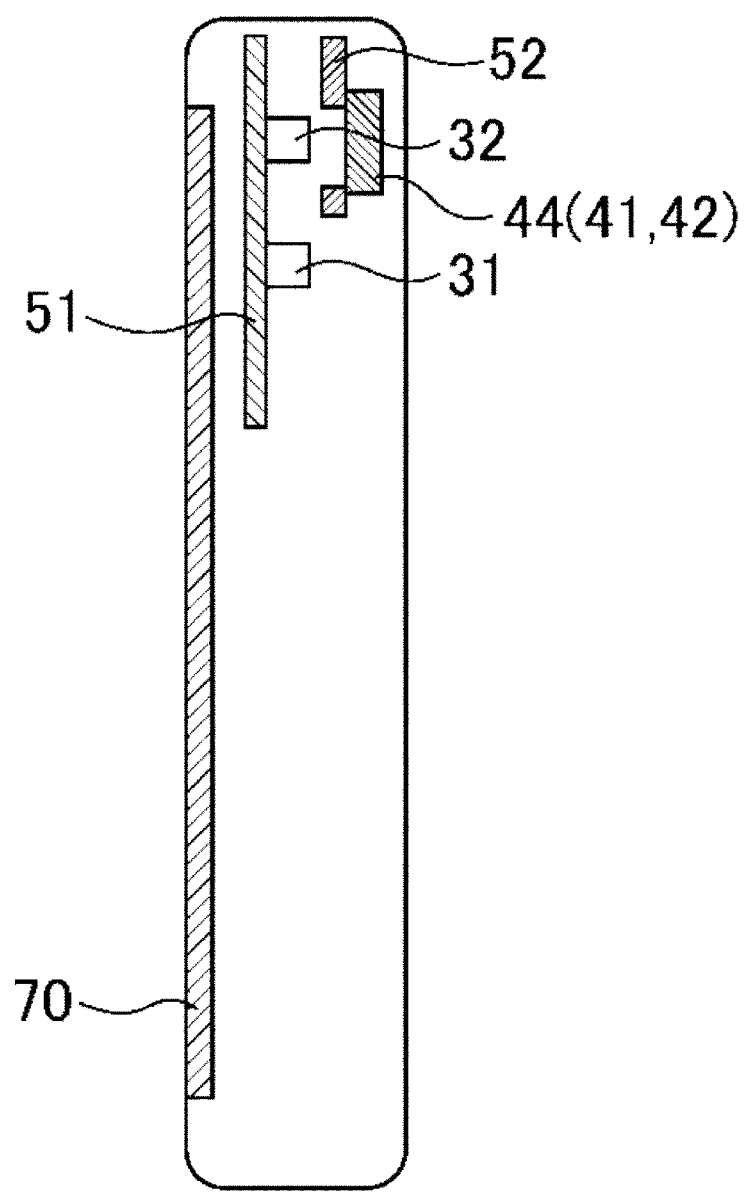
FIG. 10 is a sectional view of the smartphone illustrated in FIG. 8 taken along the line XB-XB.

FIG. 8 is a plan view illustrating a rear side of an entire image of an embodiment that is applied to a smartphone as an electronic device provided with a spectroscopic camera according to the second embodiment of the present disclosure, FIG. 9 is a sectional view of the smartphone illustrated in FIG. 8 taken along the line IXA-IXA, and FIG. 10 is a sectional view of the smartphone illustrated in FIG. 8 taken along the line XB-XB.

Hereinafter, differences between the spectroscopic camera 10 according to the second embodiment and the spectroscopic camera 10 according to the aforementioned first embodiment will be mainly described, and description of similar matters will be omitted.

The spectroscopic camera 10 according to the second embodiment illustrated in FIGS. 8 and 9 is similar to the spectroscopic camera 10 according to the first embodiment other than that the first spectral portion 41 and the second spectral portion 42 are formed by an integrally formed third spectral portion 44.

In the spectroscopic camera 10 according to the second embodiment, the second light source 32 and the first monochrome imaging element 21 are disposed in proximity, and the first light source 31 and the second monochrome imaging element 22 are disposed in proximity as illustrated in FIG. 8. Among them, the third spectral portion 44 that corresponds to integrally formed first spectral portion 41 and second spectral portion 42 is disposed on the circuit board 52 such that the third spectral portion 44 covers the second light source 32 and the first monochrome imaging element 21. In this manner, the third spectral portion 44 is disposed both on the optical axis of the second light source 32 and the measurement target X and on the optical axis of the first monochrome imaging element 21 and the measurement target X.

In the spectroscopic camera 10 according to the second embodiment with such a configuration, the third spectral portion 44 is configured by a wavelength variable interference filter with a wide spectral range capable of covering both the second light source 32 and the first monochrome imaging element 21, that is, a Fabry-Perot etalon filter. In this manner, it is possible to cause a single third spectral portion 44 to serve both as the first spectral portion 41 and the second spectral portion 42. Also, since the control circuit for controlling the third spectral portion 44 does not require to be prepared for each of the first spectral portion 41 and the second spectral portion 42 as in the first embodiment, it is possible to reduce the size of the circuit board 52 on which the third spectral portion 44 is disposed. Therefore, it is possible to simplify the structure of the spectroscopic camera 10 and thus the smartphone 1 and to realize cost reduction.

Effects that are similar to those in the aforementioned first embodiment can be obtained by such a spectroscopic camera 10 according to the second embodiment.

Next, a third embodiment of the spectroscopic camera 10 included in the smartphone 1 will be described.

Figure 11:
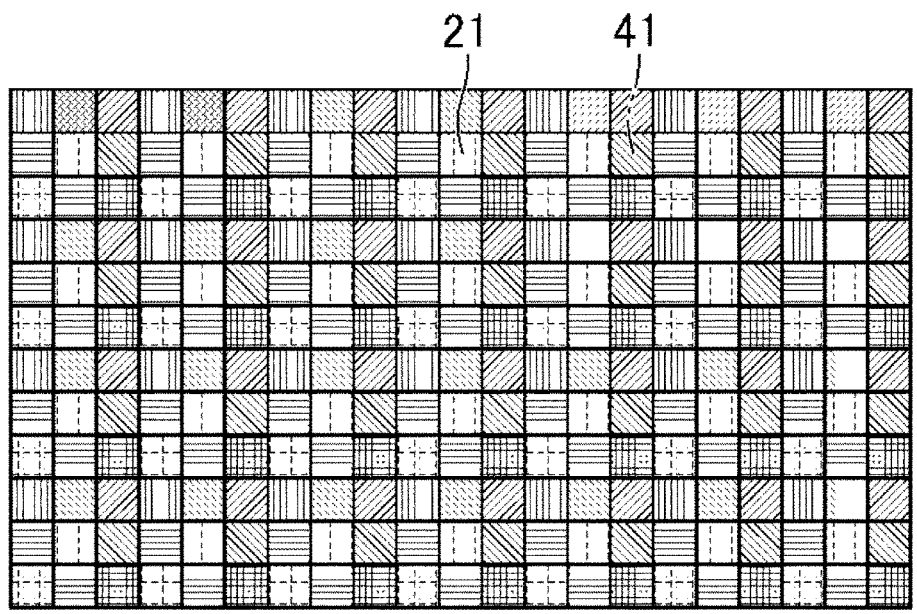
FIG. 11 is a plan view illustrating a first spectral portion and a first monochrome imaging element included in a spectroscopic camera according to a third embodiment of the present disclosure.
Figure 12:
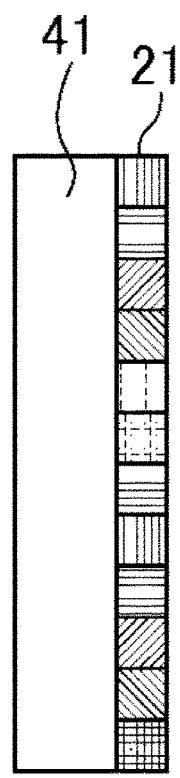
FIG. 12 is a side view illustrating the first spectral portion and the first monochrome imaging element included in the spectroscopic camera according to the third embodiment of the present disclosure.

FIG. 11 is a plan view illustrating a first spectral portion and a first monochrome imaging element included in the spectroscopic camera according to the third embodiment of the present disclosure, and FIG. 12 is a side view illustrating the first spectral portion and the first monochrome imaging element included in the spectroscopic camera according to the third embodiment of the present disclosure.

Hereinafter, differences between the spectroscopic camera 10 according to the third embodiment and the spectroscopic camera 10 according to the first embodiment will be mainly described, and description of similar matters will be omitted.

The spectroscopic camera 10 according to the third embodiment is similar to the spectroscopic camera 10 according to the first embodiment other than that a first spectral portion 41 and a first monochrome imaging element 21 with different configurations are included and the first spectral portion 41 and the first monochrome imaging element 21 are integrally formed as illustrated in FIGS. 11 and 12.

In the spectroscopic camera 10 according to the third embodiment, disposition of the first spectral portion 41 on the circuit board 52 is omitted, and the first spectral portion 41 is disposed directly at the first monochrome imaging element 21 as illustrated in FIGS. 11 and 12. In this manner, the first spectral portion 41 and the first monochrome imaging element 21 are integrally formed. It is possible to reduce the sizes of the first spectral portion 41 and the first monochrome imaging element 21 through such integration, to thereby simplify the structure of the spectroscopic camera 10 and thus the smartphone 1, and to realize size reduction.

Effects that are similar to those in the aforementioned first embodiment can be obtained by such a spectroscopic camera 10 according to the third embodiment.

Next, a fourth embodiment of the spectroscopic camera 10 included in the smartphone 1 will be described.

Figure 13:
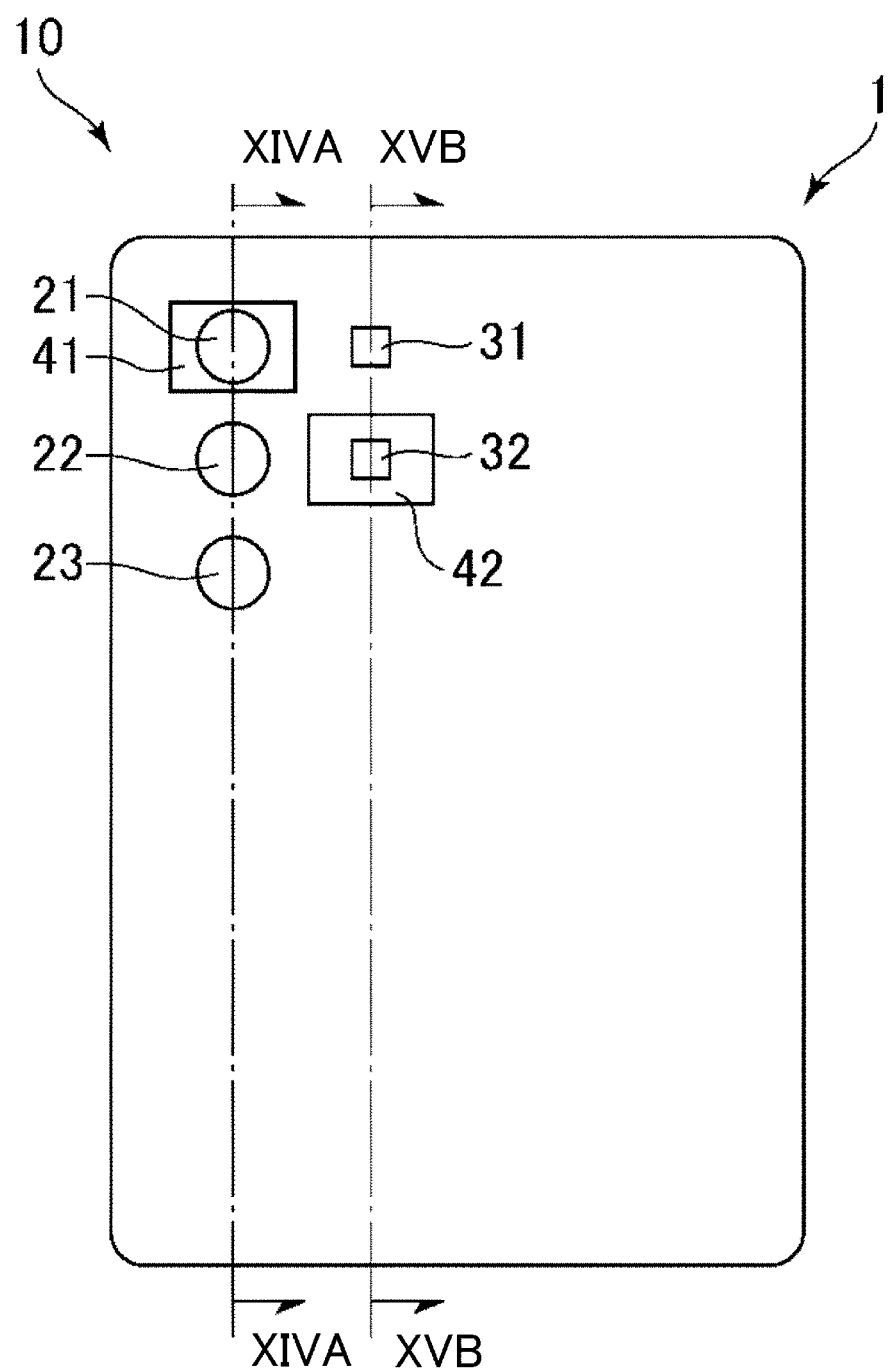
FIG. 13 is a plan view illustrating a rear side of an overall image of an embodiment that is applied to a smartphone as an electronic device provided with a spectroscopic camera according to a fourth embodiment of the present disclosure.
Figure 14:
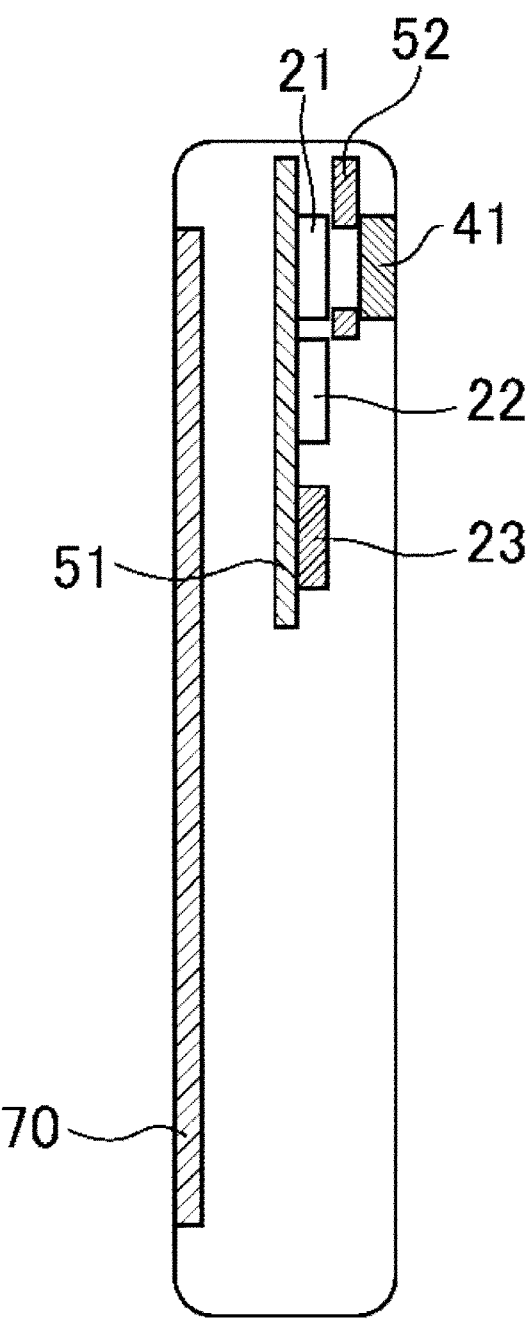
FIG. 14 is a sectional view of the smartphone illustrated in FIG. 13 taken along the line XIVA-XIVA.

FIG. 13 is a plan view illustrating a rear side of an overall image of an embodiment that is applied to a smartphone as an electronic device provided with the spectroscopic camera according to the fourth embodiment of the present disclosure, FIG. 14 is a sectional view of the smartphone illustrated in FIG. 13 taken along the line XIVA-XIVA, and FIG.

15 is a sectional view of the smartphone illustrated in FIG. 13 taken along the line XVB-XVB.

Hereinafter, differences between the spectroscopic camera 10 according to the fourth embodiment and the spectroscopic camera 10 according to the aforementioned first embodiment will be mainly described, and description of similar matters will be omitted.

Figure 15:
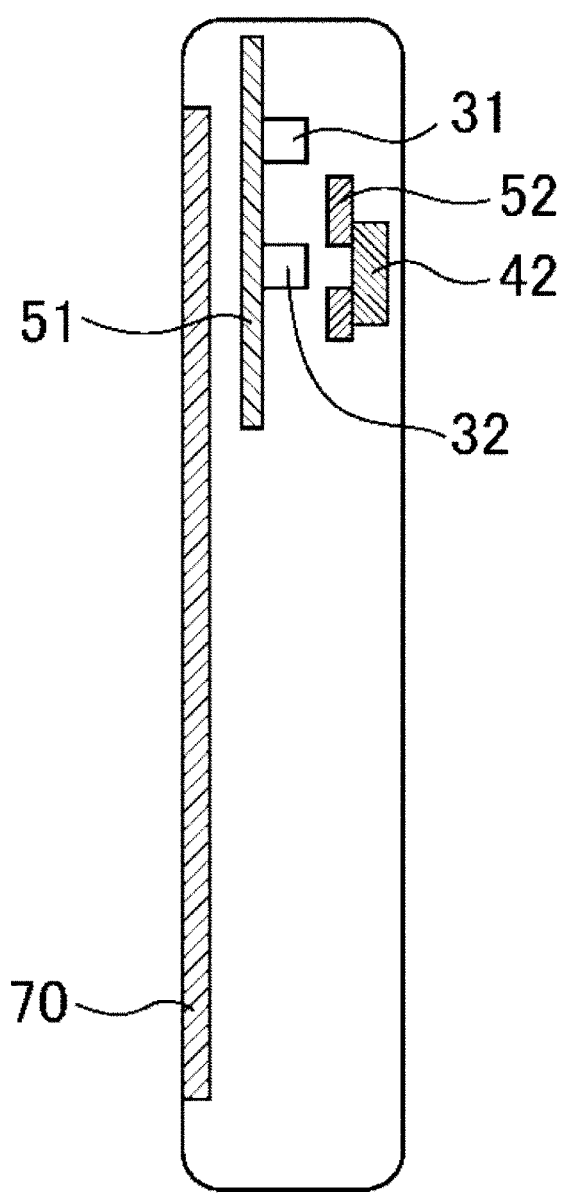
FIG. 15 is a sectional view of the smartphone illustrated in FIG. 13 taken along the line XVB-XVB.

The spectroscopic camera 10 according to the fourth embodiment illustrated in FIGS. 13 to 15 is similar to the spectroscopic camera 10 according to the aforementioned first embodiment other than that a color imaging element 23 provided on the circuit board 51 is further provided.

That is, the color imaging element 23 that is directed in the same direction as that of the first monochrome imaging element 21 and the second monochrome imaging element 22 and that is capable of imaging colors, for example, RGB are disposed as well as the first monochrome imaging element 21 and the second monochrome imaging element 22 on the circuit board 51 on the rear surface side of the smartphone 1 as illustrated in FIGS. 13 and 14 in the spectroscopic camera 10 according to the fourth embodiment. In this manner, it is possible to use a movie (image) obtained by the color imaging element 23 capturing the image displayed on the display unit 15 included in the display 70 before and after the measurement of the measurement target X, to acquire the movie as a color movie, and to thereby improve visuality of the measurement target X. Therefore, it is possible to improve operability when the spectroscopic image of the measurement target X is acquired by the spectroscopic camera 10.

Effects that are similar to those in the aforementioned first embodiment can be obtained by the spectroscopic camera 10 according to such a fourth embodiment.

Note that the spectroscopic camera 10 can also choose a second non-spectroscopy mode (fourth mode) in which the first light source 31 is turned on when the color imaging element 23 is operated, and the spectroscopic camera 10 can also function as a camera that acquires a non-spectroscopic color image in the embodiment.

Although the case in which the spectroscopic camera 10 includes the second light source 32, the second spectral portion 42, and the second monochrome imaging element 22 as the spectroscopic camera 10 of the pre-dispersive spectroscopy scheme has been described in the embodiments, the second monochrome imaging element 22 among them may be omitted. In this case, the acquisition of the spectroscopic image (observation) is performed by the color imaging element 23 in the aforementioned process <4B> in the pre-dispersive spectroscopy mode using the spectroscopic camera of the pre-dispersive spectroscopy scheme, and the specification of the measurement target X is performed using the spectroscopic image acquired by the color imaging element 23.

Although the spectroscopic camera and the electronic device according to the present disclosure have been described above, the present disclosure is not limited thereto.

Although operations of the first light source 31, the second light source 32, the first monochrome imaging element 21, the second monochrome imaging element 22, the first spectral portion 41, the second spectral portion 42, and the like are controlled by the control unit 60 mounted in the spectroscopic camera 10 (smartphone 1) in the aforementioned embodiments, for example, the present disclosure is not limited thereto, and at least one of them may be controlled by a control unit in a device externally attached to the smartphone 1 or some control unit at a counterpart that is communicable or is connected via a network, for example.

Although the case in which the smartphone described as an example of the electronic device according to the present disclosure includes the display unit, the input unit, and the storage unit has been described, the electronic device is not limited to one with such a configuration, and a configuration in which the display unit and the input unit may be provided in an external terminal such as another smartphone that is different from the smartphone provided with the spectroscopic camera or a computer, and further, the storage unit is provided in an external server, and data exchange among the smartphone provided with the spectroscopic camera, the external terminal, and the external server is performed via a communication unit may be employed.

Further, the electronic device according to the present disclosure, that is, the electronic device provided with the spectroscopic camera according to the present disclosure is not limited to the smartphone and may be various kinds of device that has an imaging function, such as a digital camera, a tablet personal computer (PC), a drone, a robot, a cash dispenser, a face recognition sensor, or a head mounted display (HMD).

What is claimed is:

1. A spectroscopic camera comprising:
a first light source configured to emit a first source light toward a measurement target along a first optical axis;
a second light source configured to emit a second source light toward the measurement target along a second optical axis;
a first monochrome image sensor configured to receive a first reflected light from the measurement target along a third optical axis so as to create a first image, the first reflected light being formed by reflecting the first source light from the measurement target;
a first wavelength variable spectral filter configured to selectively emit a first filter light with a first predetermined wavelength from a first incident light and change a wavelength region of the emitted first filter light, the first incident light being formed based on the first reflected light;
a second wavelength variable spectral filter configured to selectively emit a second filter light with a second predetermined wavelength from a second incident light and change a wavelength region of the emitted second filter light, the second incident light being formed based on the second source light;
a memory configured to store a program; and
a processor configured to execute the program so as to:
control operations of the first light source, the second light source, the first monochrome image sensor, the first wavelength variable spectral filter, and the second wavelength variable spectral filter;
perform a first mode in which the first monochrome image sensor and the first wavelength variable spectral filter are operated; and
perform a second mode in which the second light source and the second wavelength variable spectral filter are operated,
wherein the first light source, the second light source, and the first monochrome image sensor face toward a same direction,
the first wavelength variable spectral filter is disposed between the first monochrome image sensor and the measurement target in the third optical axis, the second wavelength variable spectral filter is disposed between the second light source and the measurement target in the second optical axis, and the processor is configured to perform one of the first mode or the second mode at a time.

2. The spectroscopic camera according to claim 1, wherein the first light source is configured to emit the first source light when the first monochrome image sensor is operated in the first mode.

3. The spectroscopic camera according to claim 1, wherein the first light source and the second light source are configured to emit the first source light and the second source light in an at least partially temporally overlapping manner.

4. The spectroscopic camera according to claim 1, further comprising:
a second monochrome image sensor configured to receive a second reflected light from the measurement target along a fourth optical axis so as to create a second image, the second reflected light being formed by reflecting the second filter light from the measurement target, the second monochrome image sensor facing toward the same direction as the first light source, the second light source, and the first monochrome image sensor.

5. The spectroscopic camera according to claim 4, wherein the second light source is configured to emit the second source light when the second monochrome image sensor is operated in the second mode.

6. The spectroscopic camera according to claim 1, wherein the first wavelength variable spectral filter and the second wavelength variable spectral filter are integrally formed.

7. The spectroscopic camera according to claim 1, wherein the first wavelength variable spectral filter and the first monochrome image sensor are integrally formed.

8. The spectroscopic camera according to claim 1, further comprising:
at least one optical component.

9. The spectroscopic camera according to claim 1, further comprising:
at least one color image sensor, the at least one color image sensor facing toward the same direction as the first light source, the second light source, and the first monochrome image sensor.

10. An electronic device comprising:
a display configured to display information relating to a measurement target;
a first light source configured to emit a first source light toward the measurement target along a first optical axis;
a second light source configured to emit a second source light toward the measurement target along a second optical axis;
a first monochrome image sensor configured to receive a first reflected light from the measurement target along a third optical axis so as to create a first image, the first reflected light being formed by reflecting the first source light from the measurement target;
a first wavelength variable spectral filter configured to selectively emit a first filter light with a first predetermined wavelength from a first incident light and change a wavelength region of the emitted first filter light, the first incident light being formed based on the first reflected light;
a second wavelength variable spectral filter configured to selectively emit a second filter light with a second predetermined wavelength from a second incident light and change a wavelength region of the emitted second filter light, the second incident light being formed based on the second source light;
a memory configured to store a program; and
a processor configured to execute the program so as to:
control operations of the first light source, the second light source, the first monochrome image sensor, the first wavelength variable spectral filter, and the second wavelength variable spectral filter;
perform a first mode in which the first monochrome image sensor and the first wavelength variable spectral filter are operated; and
perform a second mode in which the second light source and the second wavelength variable spectral filter are operated,
wherein the first light source, the second light source, and the first monochrome image sensor face toward a same direction,
the first wavelength variable spectral filter is disposed between the first monochrome image sensor and the measurement target in the third optical axis,
the second wavelength variable spectral filter is disposed between the second light source and the measurement target in the second optical axis, and
the processor is configured to perform one of the first mode or the second mode at a time.

* * * * *